(Model.)

R. O'HARA & C. H. REMINGTON.
HORSESHOE.

No. 282,108. Patented July 31, 1883.

WITNESSES:
Fred. L. Dieterich,
Maurice Delmar.

Robert O'Hara,
and Charles H. Remington.
INVENTORS.
By Louis Bagger & Co
ATTORNEYS

UNITED STATES PATENT OFFICE.

ROBERT O'HARA AND CHARLES H. REMINGTON, OF GILROY, CALIFORNIA.

HORSESHOE.

SPECIFICATION forming part of Letters Patent No. 282,108, dated July 31, 1883.

Application filed May 12, 1883. (Model.)

*To all whom it may concern:*

Be it known that we, ROBERT O'HARA and CHARLES HASKIN REMINGTON, of Gilroy, in the county of Santa Clara and State of California, have invented certain new and useful Improvements in Horseshoes; and we do hereby declare that the following is a full, clear, and exact description of the invention, which will enable others skilled in the art to which it appertains to make and use the same, reference being had to the acompanying drawings, which form a part of this specification, and in which—

Figure 1:
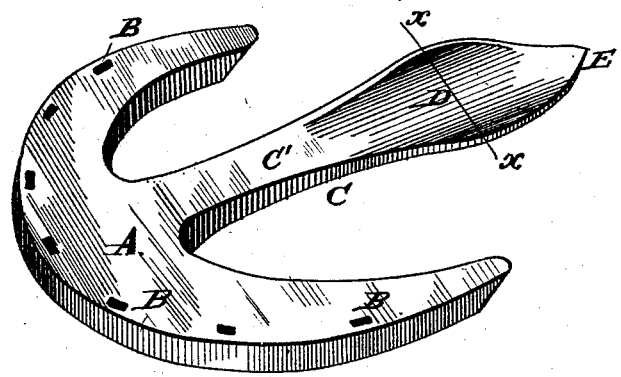
Figure 2:
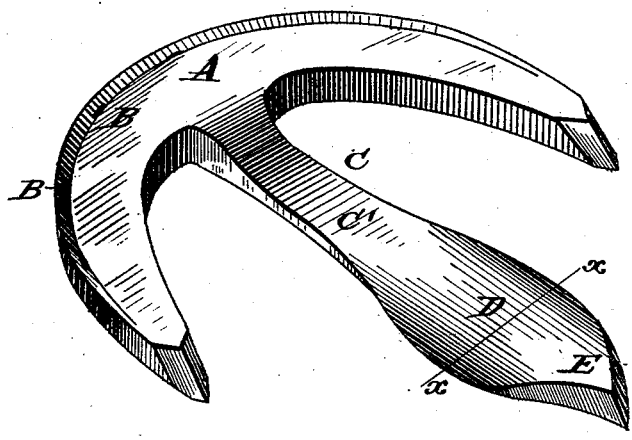
Figure 3:

Figure 1 is a perspective top view of our improved horseshoe. Fig. 2 is a similar view of the under side of the same; and Fig. 3 is a cross-section through the line indicated by $xx$ in Figs. 1 and 2.

Similar letters of reference indicate corresponding parts in all the figures.

Our invention has relation to that class of horseshoes in which a frog-supporting bar extends from the the toe-piece of the shoe, and it has for its object to provide a shoe which will protect all the parts of the hoof which need protection and avoid loading the horse's hoof with a needless weight of metal; and it consists to that effect in the improved construction of parts of the same, as hereinafter more fully described and claimed.

In the accompanying drawings, the letter A indicates the toe-piece of the shoe, which extends rearward for a distance, but is cut off at the quarters, and is provided with the usual fullering, and with a number of nail-holes, B, through which the nails securing the shoe to the hoof are driven, the nail-holes being somewhat closer to each other than in a horseshoe of the usual construction, as they have to bear the entire weight of the shoe, and one of the holes being at the point of the toe, securing the point of the shoe to the toe. In this manner all the fastening-nails are driven into that part of the hoof where the nails may have the best hold without straining and splitting the hoof, as the rear nails in the usual shape of horseshoes are apt to do, the sides of the hoof being steeper and, as is very often the case, of more brittle horn than the toe. This toe-piece protects all the portion of the hoof which, by usual work of the horse, needs protection, all the heavy wear of the hoof falling upon the toe; but in working the horse upon hard ground, and especially upon stone pavement, it is desirable to also protect the frog from injury in coming in contact with hard and sharp objects upon the road, and to this end a flat bar, C, projects rearward from the center of the rear edge of the toe-piece, the rear end of which, D, is concave, pointed upward, and spoon-shaped, so as to fit around and cover the frog, the point projecting into the central crease of the frog, preventing stones or other objects from working their way in between the plate and the frog.

The shank of the bar C is reduced in thickness, and forms a springy portion, C′, which permits the hoof to expand in the natural manner, and still keeps the frog-protecting plate pressed against the frog.

It will be seen that by this construction of the shoe the portion of the hoof which is most subjected to hard wear—viz., the toe—is perfectly protected, while the heels are allowed to expand in their natural way, and the frog is protected against all hard and sharp objects on the road by the yielding spring-supported frog-protector, which will allow the hoof to expand and to cushion the leg in stepping down—a thing which the usually-constructed shoes will not allow the hoof, thus affording a natural and perfectly-protecting shoe.

Having thus described our invention, which we are aware is not broadly new, but which contains new and essential features not before used or shown, we claim and desire to secure by Letters Patent of the United States—

The herein-described horseshoe, consisting of the toe-piece having the nail-holes for the reception of the securing-nails, and the frog-protecting bar, concave, spoon-shaped, and upwardly-pointed at its rear end, and connected to the toe-piece by the reduced spring-shank, as and for the purpose shown and set forth.

In testimony that we claim the foregoing as our own we have hereunto affixed our signatures in presence of two witnesses.

ROBERT O'HARA.
CHARLES HASKIN REMINGTON.

Witnesses:
U. H. FARMER,
GEO. E. HERSEY.